United States Patent
Nagano

[11] Patent Number: 5,217,413
[45] Date of Patent: Jun. 8, 1993

[54] GEAR CRANK APPARATUS FOR A BICYCLE FOR SUPPORTING A PLURALITY OF CHAINWHEELS

[75] Inventor: Masashi Nagano, Izumi, Japan
[73] Assignee: Shimano, Inc., Osaka, Japan
[21] Appl. No.: 860,184
[22] Filed: Mar. 30, 1992
[30] Foreign Application Priority Data
Apr. 11, 1991 [JP] Japan .................. 3-23918[U]
[51] Int. Cl.$^5$ ........................................... F16H 55/30
[52] U.S. Cl. ...................................... 474/152; 474/160
[58] Field of Search ............... 474/152, 160, 178, 158; 74/594.2, 594.1

[56] References Cited

U.S. PATENT DOCUMENTS

| | | |
|---|---|---|
| 3,919,898 | 11/1975 | Sugino . |
| 4,009,621 | 3/1977 | Segawa . |
| 4,106,357 | 8/1978 | Segawa .................. 474/160 |
| 4,259,880 | 4/1981 | Ueno .................. 474/160 X |
| 4,741,724 | 5/1988 | Wang .................. 474/160 |
| 4,988,328 | 1/1991 | Iwasaki et al. .................. 474/160 |
| 5,123,878 | 6/1992 | Nagano .................. 474/160 |

FOREIGN PATENT DOCUMENTS

| | | |
|---|---|---|
| 431573A1 | 6/1991 | European Pat. Off. . |
| 910559 | 6/1946 | France . |
| 2548998 | 1/1985 | France . |
| 2213439 | 8/1989 | United Kingdom . |

Primary Examiner—Thuy M. Bui
Attorney, Agent, or Firm—Dickstein, Shapiro & Morin

[57] ABSTRACT

A gear crank apparatus for a bicycle for supporting a plurality of chainwheels. This apparatus includes a boss secured to an end of a crank axle, a chainwheel supporting member extending radially outwardly from the boss for supporting the chainwheels axially spaced apart from one another, and a crank.

The crank includes a first crank portion extending radially outwardly from the boss and inclined axially outwardly away from a side face of an adjacent chainwheel supported by the chainwheel supporting member to a position adjacent an outer periphery of the adjacent chainwheel, and a second crank portion extending from the first crank portion in a direction substantially perpendicular to the axis.

The chainwheel supporting member extends from the boss as inclined axially inwardly away from the crank and includes chainwheel mounting surfaces formed in peripheral regions thereof and extending perpendicular to the axis for attaching the chainwheels.

6 Claims, 3 Drawing Sheets

F I G . 1
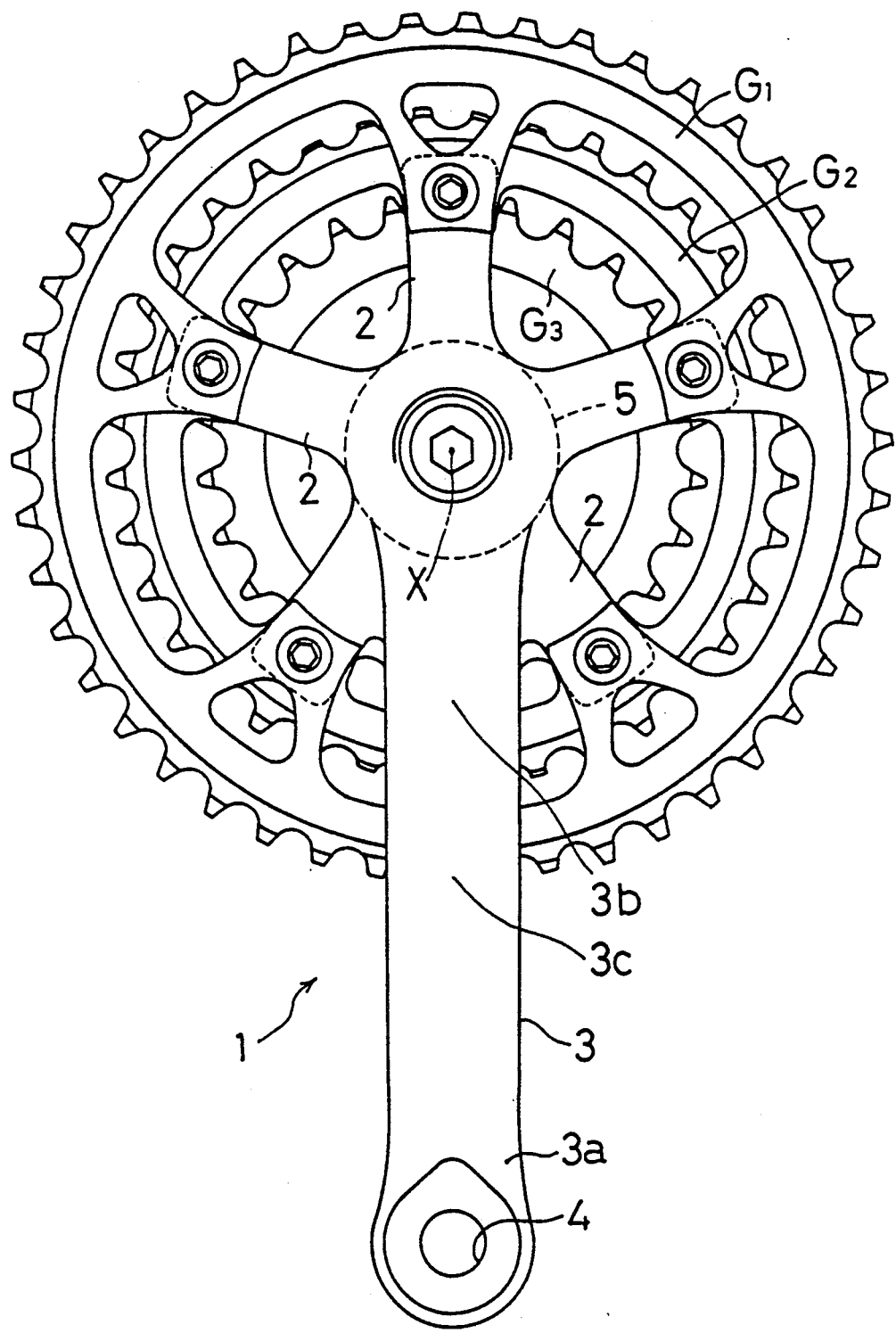

GEAR CRANK APPARATUS FOR A BICYCLE FOR SUPPORTING A PLURALITY OF CHAINWHEELS

BACKGROUND OF THE INVENTION

1. Field of the Invention

The present invention relates to a gear crank apparatus for a bicycle having a boss connected to a crank axle, a chainwheel supporting member formed integral with the boss, and a crank extending from the boss.

2. Description of the Related Art

A conventional gear crank apparatus as noted above is disclosed in Japanese utility model application laid open under No. 1977-112055, for example. This apparatus has a boss projecting a considerable amount axially outwardly from chainwheels attached to the apparatus.

Such a conventional apparatus has a disadvantage that, when a pedaling foot slips inwardly in the lower part of pedaling movement, the tiptoe, heel or ankle approaches and could contact the boss of the gear crank apparatus depending on position of the crank. Even where the shoe is fixed to the pedal by means of a cleat, play is allowed in the engagement between shoe and pedal. It is therefore possible that the tiptoe or heel swing toward the boss and contact the boss or adjacent parts.

SUMMARY OF THE INVENTION

The object of the present invention is to provide a gear crank apparatus for a bicycle which avoids contact between foot and gear crank apparatus, particularly contact between the tiptoe or heel and a crank boss region, as much as possible while securing a necessary axial length for a connection between crank axle and boss.

The above object is fulfilled, according to the present invention, by a gear crank apparatus comprising a crank including a first crank portion extending radially outwardly from a boss secured to an end of a crank axle, and inclined axially outwardly away from a side face of an adjacent chainwheel supported by a chainwheel supporting member to a position adjacent an outer periphery of the adjacent chainwheel, and a second crank portion extending from the first crank portion in a direction substantially perpendicular to an axis of the crank axle.

According to this crank structure, the crank boss is displaced toward the center of the bicycle relative to the extreme end of the second crank portion to which a pedal is attached. This reduces the possibility of the cyclist's foot on the pedal contacting the boss in pedaling action. Further, a space is secured axially of the crank axle between a peripheral region of the outermost chainwheel and the crank, i.e. the second crank portion. This space may be utilized for unhindered operation of a front derailleur.

This crank structure allows the cyclist to move his foot to a certain extent sideways on the pedal without causing the tiptoe or heel to contact the crank boss region. Thus, the cyclist may pedal the bicycle while keeping his foot in an optimal position for turning the crank, to ride the bicycle comfortably without unduly straining the muscles.

Other features and advantages of the present invention will become apparent from the following description of the preferred embodiment taken with reference to the accompanying drawings.

BRIEF DESCRIPTION OF THE DRAWINGS

FIG. 1 is a side view of a gear crank apparatus according to the present invention.

DETAILED DESCRIPTION OF THE PREFERRED EMBODIMENT

Figure 2:
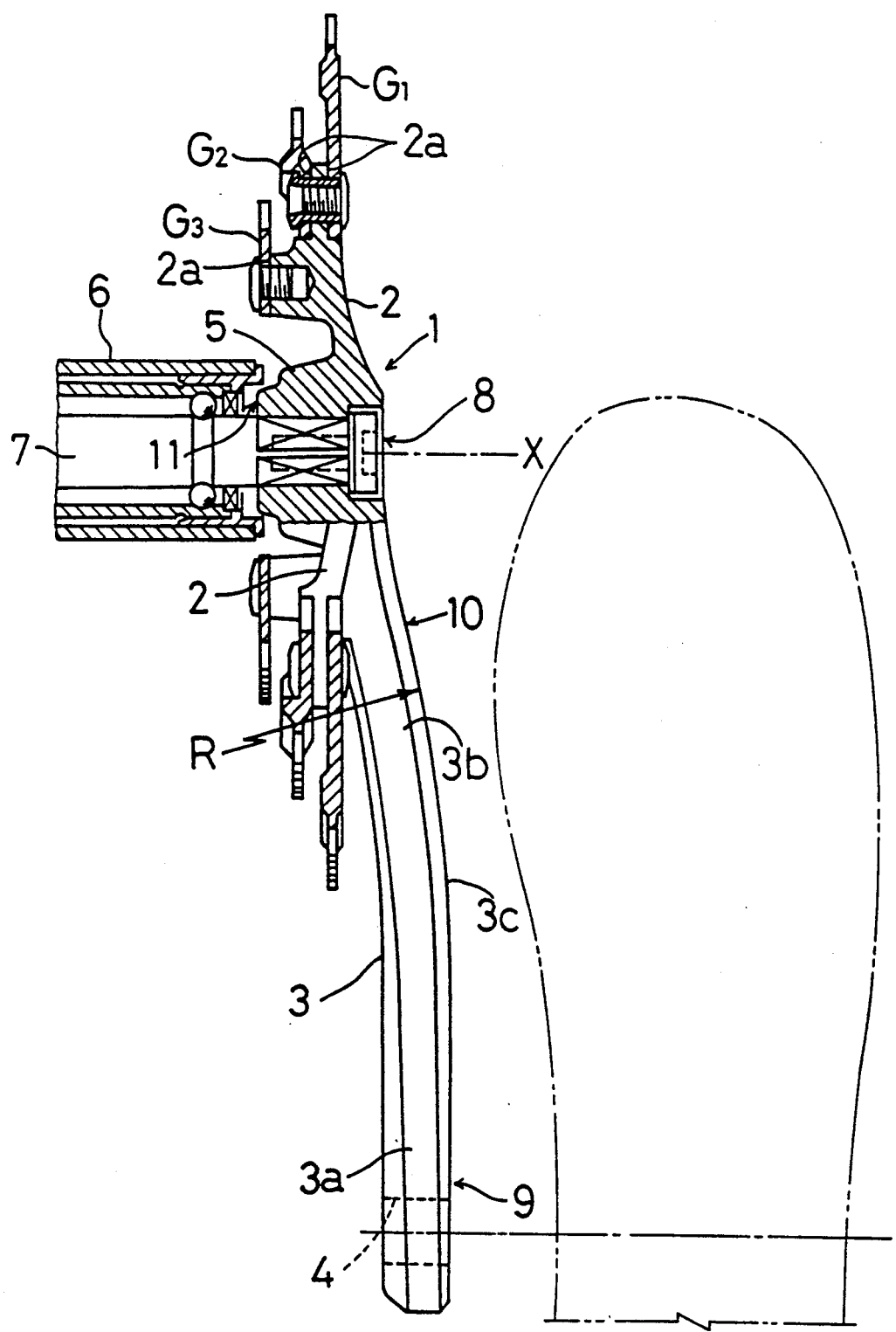
FIG. 2 is a front view, partly in section, of the gear crank apparatus.

As shown in FIG. 1, a gear crank apparatus according to the present invention includes a plurality of chainwheel supporting arms 2 for supporting three chainwheels or gears G1, G2 and G3 of different diameters bolted thereto coaxially with a crank axis X and axially spaced from one another, and a crank 3 defining a pedal mounting bore 4 at an extreme end thereof for attaching a pedal (only a centerline of which is shown in the drawings). As shown in FIG. 2, the chainwheel supporting arms 2 and crank 3 extend radially outwardly from peripheral surfaces of a boss 5. The boss 5 is connected to a crank axle 7 to be rotatable therewith, the crank axle 7 being rotatably mounted in a bottom bracket 6 fixed to a bicycle frame.

As shown in FIGS. 1 and 2, the boss 5, all the chainwheel supporting arms 2 and the crank 3 are formed as an integral unit, with the chainwheel supporting arms 2 arranged substantially equidistantly around the boss 5 to extend radially therefrom, and the crank 3 disposed between an adjacent pair of the chainwheel supporting arms 2 in side view. Each of the chainwheel supporting arms 2 extends as inclined toward the bottom bracket 6, i.e. inclined inward axially of the crank axle 7, and includes chainwheel mounting surfaces 2a formed at different distances from the boss 5 and extending perpendicular to the crank axis X. The boss 5 has an outer end surface 8 perpendicular to the crank axis X. As seen from FIG. 2, each chainwheel supporting arm 2 has an outer side surface defining an inwardly bowed inclination continuous from the end surface 8 of the boss 5. This outer side surface is smoothly continuous with a side surface of the outermost, largest chainwheel G1.

The crank 3 includes a first crank portion 3b extending radially outwardly from the boss 5 as inclined axially outwardly away from the side face of the outermost chainwheel G1 to a position adjacent an outer periphery of the chainwheel G1, and a second crank portion 3a extending from the first crank portion 3b in a direction substantially perpendicular to the crank axis X. A transitional portion 3c between the first crank portion 3b and second crank portion 3a, in this embodiment, is spaced from the axis X by approximately half a distance from the axis X to the extreme end of the second crank portion 3a.

The first crank portion 3b has an outer side surface first defining an inwardly bowed inclination continuous from the outer end surface 8 of the boss 5, as does the outer side surface of each chainwheel supporting arm 2, and then defining an outwardly bowed inclination having a radius R. In this way, the first crank portion 3b extends to the transitional portion 3c smoothly with a continuous curved surface.

The crank 3 has a substantially constant thickness in the direction along the crank axis X. The above-noted inclinations of each chainwheel supporting arm 2 and the first crank portion 3b form a space between the outer periphery, i.e. teeth, of the outermost chainwheel G1, and an inner side surface of the crank 3, which space is necessary for operation of a front derailleur. Also because of such inclinations, the outer end surface 8 of the boss 5 is disposed inwardly with respect to the extreme end of the crank 3. This inwardly disposed outer end surface 8 has a reduced chance of contacting the tiptoe, heel or ankle of the cyclist when the cyclist's foot (shown in a phantom line in FIG. 2) slips slightly in a horizontal direction on the pedal.

Figure 3:
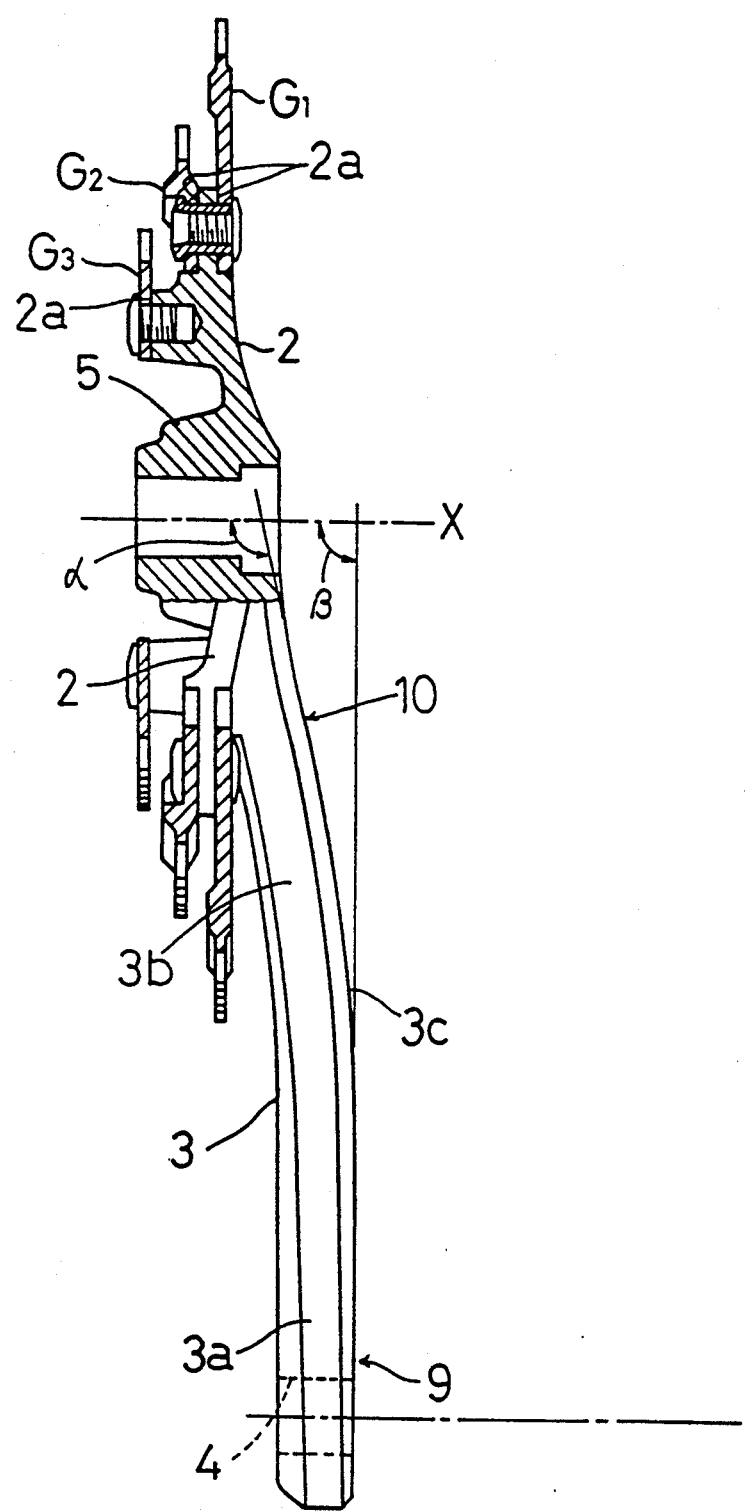
FIG. 3 is a front view, partly in section, of the gear crank apparatus.

As shown in FIG. 3, for example, the crank 3 is designed such that a tangent to a transition 10 between the inwardly bowed surface to the outwardly bowed surface of the first crank portion 3b forms an angle alpha of about 110 to 120 degrees with the crank axis X, which is distinctly larger than the angle beta of 90 degrees formed between the crank axis X and an extension line from a side surface 9 of the second crank portion 3a.

Of the chainwheel mounting surfaces 2a of each chainwheel supporting arm 2, the surface closest to the end of the crank axle 7 which is the surface for attaching the smallest chainwheel G3 is recessed with respect to an inner end surface 11 of the boss 5. The end surface 11 is substantially level in the axial direction with an inner side wall of the smallest chainwheel G3.

Thus, although the outer end surface 8 of the boss 5 is recessed inwardly, the boss has as large a length as possible for fitting on the crank axle 7. This provides a rigid connection between the boss 5 and crank axle 7.

While the plurality of arms act as a chainwheel supporting member, a chainwheel supporting disk may be employed instead.

The present invention may be applied to a gear apparatus having four or more chainwheels or two or less chainwheels attached. Further, the present invention is applicable to a left crank as well.

What is claimed is:

1. A gear crank apparatus for a bicycle for supporting a plurality of chainwheels, comprising:
    a crank axle having a horizontal axis and rotatably attached to a bicycle frame;
    a boss secured to an end of said crank axle, and having an inner end surface opposed to said end of said crank axle and an outer end surface remote therefrom, said inner and outer end surfaces being on planes substantially perpendicular to said axis;
    a chainwheel supporting member extending radially outwardly from said boss for supporting said plurality of chainwheels axially spaced apart from one another; and
    crank means including a first crank portion extending radially outwardly from said boss and inclined axially outwardly away from a side face of an adjacent chainwheel supported by said chainwheel supporting member to a position adjacent an outer periphery of said adjacent chainwheel, and a second crank portion extending from said first crank portion in a direction substantially perpendicular to said axis.

2. A gear crank apparatus as claimed in claim 1, wherein said first crank portion extends as a continuous transition from said outer end surface of said boss.

3. A gear crank apparatus as claimed in claim 2, wherein said chainwheel supporting member extends from said boss as inclined axially inwardly away from said crank means, and includes chainwheel mounting surfaces formed in peripheral regions thereof and extending perpendicular to said axis for attaching said chainwheels.

4. A gear crank apparatus as claimed in claim 3, wherein one of said chainwheel mounting surfaces closest to said end of said crank axle is recessed with respect to said inner end surface of said boss.

5. A gear crank apparatus as claimed in claim 5, wherein said inner end surface of said boss is substantially level in the axial direction with an inner side wall of one of said chainwheels closest to said end of said crank axle.

6. A gear crank apparatus for a bicycle for supporting a plurality of chainwheels, comprising:
    a crank axle having a horizontal axis and rotatably attached to a bicycle frame;
    a boss secured to an end of said crank axle, and having an inner end surface opposed to said end of said crank axle and an outer end surface remote therefrom, said inner and outer end surfaces being on planes substantially perpendicular to said axis;
    a chainwheel supporting member extending radially outwardly from said boss for supporting said plurality of chainwheels axially spaced apart from one another; and
    crank means including a first crank portion extending radially outwardly from said boss and inclined axially outwardly away from a side face of an adjacent chainwheel supported by said chainwheel supporting member to a position adjacent an outer periphery of said adjacent chainwheel, and a second crank portion extending from said first crank portion in a direction substantially perpendicular to said axis, a transitional portion between said first crank portion and said second crank portion being spaced from said axis by approximately half a distance from the said axis to an extreme end of said second crank portion.

* * * * *